C. E. CLEMENS.
VEHICLE SPRING.
APPLICATION FILED JUNE 7, 1917. RENEWED FEB. 5, 1919.
1,316,017.
Patented Sept. 16, 1919.
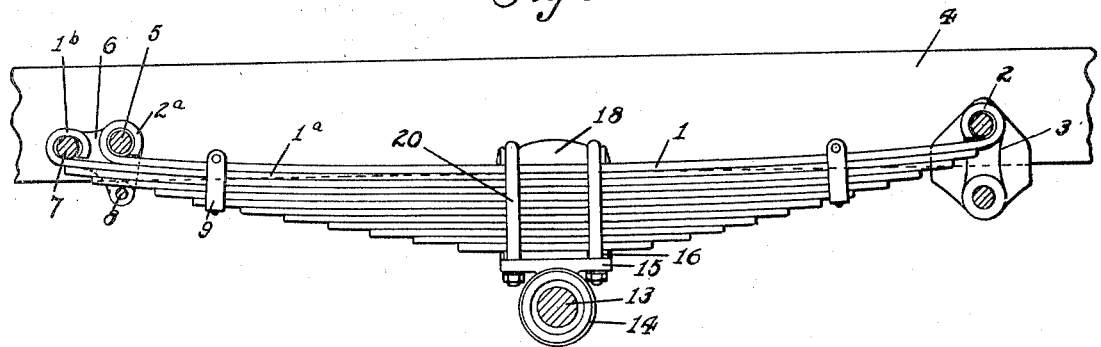
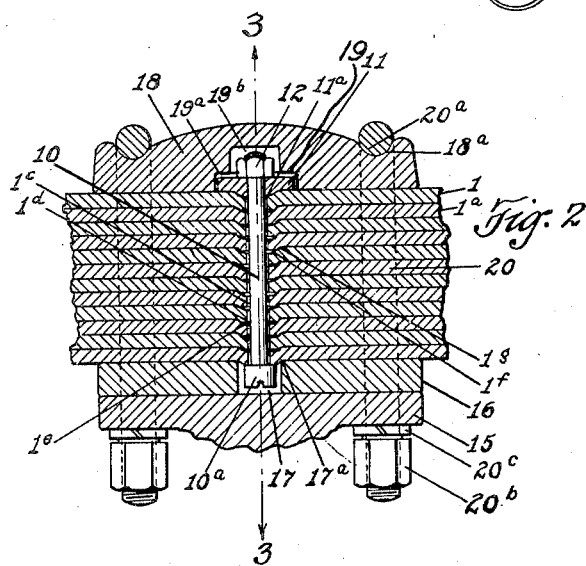
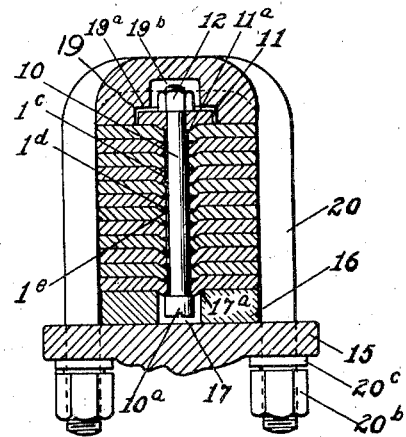
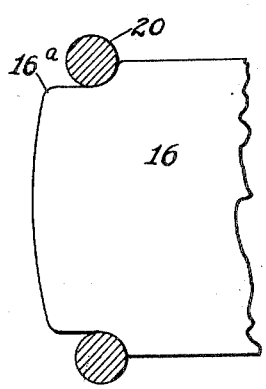
Inventor
Chester E. Clemens,
By Hull, Smith, Brock & West,
Attorneys

UNITED STATES PATENT OFFICE.

CHESTER E. CLEMENS, OF CLEVELAND, OHIO, ASSIGNOR TO THE STANDARD PARTS COMPANY, OF CLEVELAND, OHIO, A CORPORATION OF OHIO.

VEHICLE-SPRING.

1,316,017.  Specification of Letters Patent.  Patented Sept. 16, 1919.

Application filed June 7, 1917, Serial No. 173,271. Renewed February 5, 1919. Serial No. 275,197.

*To all whom it may concern:*

Be it known that I, CHESTER E. CLEMENS, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and more particularly to the type of springs wherein both the drive and the torque are taken through the springs, this action imposing upon the springs the combined stresses of drive and torque, with the resultant tendency or liability to loosen the spring on the axle seat. This loosening of the connection, in all ordinary constructions, imposes an undue strain upon the center bolt, frequently resulting in shearing the latter and allowing the plates an undesirable freedom of action relative to each other.

It is the general object of this invention to provide a coöperating construction of spring and seat-clamping and supporting means whereby relative longitudinal movement of the spring as a whole with reference to the spring seating and clamping means will be prevented. A further object of the invention is to secure the foregoing results without subjecting the center bolt to any shearing action.

In the drawings forming part hereof, wherein one embodiment of my invention is illustrated, Figure 1 represents a side elevation of part of a vehicle frame and of a spring connected thereto and to an axle seat the connections between the ends of the spring and the frame being shown in section; Fig. 2 a central longitudinal sectional view through the said spring, axle chair and associated parts; Fig. 3 a transverse sectional view through the parts shown in Fig. 2; and Fig. 4 a detail in plan of a filler block which may be employed with the axle 7, the clips being shown in section.

Describing by reference characters the various parts illustrated herein, 1 denotes the main plate and $1^a$ the auxiliary plates of a spring, the spring shown being of the semi-elliptic type. The main plate is provided with an eye 2 at one end by which it is shown as connected to shackles 3 carried by the side frame 4.

The opposite end of the main plate is connected to the frame 4 while the corresponding eye of the plate subjacent thereto is connected to a shackle, preferably of the type described and claimed in the application filed by myself and Royal K. Johnson on July 28, 1915, Serial No. 42,267. The eye $2^a$ on the end of the main plate is connected to a pin 5 to which the triangular shackle links 6 are pivoted, and an elongated eye $1^b$ on the auxiliary plate $1^a$ beneath the main plate is connected to a pin 7 extending between the shackle links 6, there being a pin 8 extending between the lower ends of the said links. The usual rebound shackles or clips 9 will be provided.

For convenience of shipping the springs in assembled condition, a center bolt is usually provided, said bolt being indicated at 10 and extending through apertures $1^c$ at the center of each plate. The metal of each plate surrounding the aperture $1^c$ is depressed by punching the central portion of each leaf out of the plane of the metal adjacent thereto. By this construction, a projection $1^d$ in the shape of a cupped bead, will be formed on one side of the spring while a corresponding complementary cupped recess $1^e$ will be formed on the opposite side, there being shoulders $1^f$ and $1^g$ connecting the upper and lower surfaces of the plates with the central cupped portion. The center bolt 10 which is usually employed for assembling purposes is shown as extending through the cups or projections of the plates with its head $10^a$ engaging the bottom of the cup on the lowermost spring plate. The upper end of this bolt is provided with a driving block 11 having a projection $11^a$ at the bottom thereof which is so shaped as to fit closely within and engage the surface of the cup provided within the top of the main plate. The driving block is secured in place by means of the usual nut 12.

13 denotes the rear axle and 14 the housing therefor. This housing is usually provided with a chair or seat 15. On top of the chair there is provided a filler block 16, said block having its upper face curved to conform to the curvature of the short spring plate thereabove and being provided with an aperture or pocket 17 for the reception of the bolt head $10^a$. The upper edges of this aperture or pocket are inclined $11^c$ or beveled, as shown at 17ª in order to conform to and engage the coöperating surface projection 1ᵈ.

On top of the main plate is the pressure block 18, said block having its lower surface curved to conform to the shape of the coöperating upper surface of the main plate. This pressure block is provided in its lower central portion with a recess 19 which is adapted to receive therewithin the driving block 11, with a small clearance between the front and back sides of the driving block and the corresponding walls of the recess, the said clearance being preferably about 1/32″. A like clearance is provided between the top of the driving block and the wall 19ª of the recess above the lateral portions of said block. Where the center bolt is retained, the recess 19 is extended, as shown at 19ᵇ in order to receive therewithin the nut 12, the clearance between the nut and the walls of the extension 19ᵇ being greater than that provided between the front and back side walls of the recess 19 and the adjacent portions of the driving block 11.

The pressure block 18 is provided with transversely extending grooves 18ª each adapted to receive the curved portion 20ª of the ordinary spring clips, the legs 20 of said clips extending on each side of the filler block 16, the latter block being shown as provided with notches 16ª at the corners thereof for the reception of said legs. The lower ends of the legs extend through the ends of the spring seat 15 and are provided with nuts 20ᵇ and spring washers 20ᶜ.

As a matter of convenience, the center bolt 10 will ordinarily be retained, although its presence is unnecessary for the purpose of securing the spring to its seat and for preventing any material relative longitudinal movement between the plates of said spring. Where the bolt is dispensed with, the recess 17 need be only of sufficient depth to receive therewithin the projection 1ᵈ on the short plate; and this recess may be formed directly in the chair or spring seat 15 instead of in a separate filler block seat 16.

With the parts constructed and arranged as described, pressure exerted longitudinally of the main plate will be transmitted through the projections 1ᵈ and recesses 1ᵉ to all of the plates therebeneath. The clips 20, 20ª will serve to hold the central portion of the spring to the seat and to maintain the connection between the main plate and the subjacent plates through the cupped projections and the coöperating cupped recesses. Should the clips become somewhat loosened, the drive block will move together with the main plate and the subjacent plates until the drive block engages the wall of the recess 19 toward which it is being moved. Further movement of the main plate and driving block will move the pressure block, thereby swinging the clips 20, 20ª about their lower ends and tightening their grip upon the pressure block, through the engagement of the parts 20ª with the sides of the recesses 18ª. This movement of driving and pressure blocks is the result of very slight but progressive creeping movement of the sloping sides of the projections 1ᵈ along their respective subjacent recesses. The whole spring tends to travel as one mass with the bead projection at the bottom and the recess at the top engaging with their respective seats at the axle and with the driving block.

Having thus described my invention, what I claim is:

1. The combination, with a multiple leaf spring having a series of leaves provided each with a projection and a complementary recess, whereby the said leaves may be assembled with the projection of one leaf resting within the recess of an adjacent leaf, of a seating member having means adapted to engage the depressed portion of the spring leaf next adjacent thereto, a driving block having a surface conforming to the depressed portion of the spring leaf of the series which is remote from the one coöperating with said seating member, a pressure block coöperating with the last mentioned leaf and having a recess for the reception of the driving block, and means for compressing the spring leaves between the pressure block and seating member.

2. The combination, with a multiple leaf spring having a series of leaves provided each with a projection and a complementary recess, whereby the said leaves may be assembled with the projection of one leaf resting within the recess of an adjacent leaf, of a seating member having a pocket to receive the depressed portion of the spring leaf next adjacent thereto, a driving block having a surface adapted to engage the depressed portion of the spring leaf of the series which is remote from the one coöperating with said seating member, a pressure block coöperating with the last mentioned leaf and having a recess for the reception of the driving block, the front and rear walls of the recess being in close proximity to the corresponding walls of said driving block, and means for compressing the spring leaves between the pressure block and seating member.

3. The combination, with a multiple leaf spring having a series of leaves provided each with a central projection and a complementary recess, whereby the said leaves may be centered with the projection of one leaf nesting within the recess of an adjacent leaf, of a bolt extending through such depressed portions of the leaves and clamping the series of leaves together, a driving block on said bolt having a part adapted to coöperate with the depressed portion of the leaf at one extremity of said series, a seating member having a recess for the reception of one end of the bolt and having means engaging the depressed portion of the adjoining leaf, a pressure block recessed to receive therein the driving block, and means coöperating with the pressure block and the seating member for compressing the spring leaves therebetween.

4. The combination, with a multiple leaf spring having a series of leaves provided each with a central projection and a complementary recess, whereby the said leaves may be assembled with the projection of one leaf nesting within the recess of an adjacent leaf, of a bolt extending through the depressed portions of said leaves, a seating member having a recess for the reception of one end of the bolt and having means adapted to engage the depressed portion of the leaf at one extremity of said series, a driving block on the opposite end of said bolt and having a surface adapted to engage the depressed portion of the leaf at the opposite extremity of said series, a pressure block coöperating with the last mentioned leaf and recessed to receive therewithin the driving block, said recess having walls in close proximity to the front and rear sides of the driving block, and means coöperating with the pressure block and the seating member to compress the spring leaves therebetween.

5. The combination, with a multiple leaf spring having a series of leaves provided each with a central projection and a complementary recess, whereby the said leaves may be centered with the projection of one leaf nesting within the recess of an adjacent leaf, of an axle chair, a filler block on said chair having a pocket adapted to receive the depressed portion of the spring leaf at one extremity of said series, a pressure block coöperating with the leaf at the opposite extremity of said series and provided with a recess facing the last-mentioned leaf, a driving block within said recess having a surface adapted to engage the depressed portion of the last-mentioned leaf, and clips extending about the pressure block and the filler block and adjustably connected to the axle chair.

6. The combination, with a multiple leaf spring having a series of leaves provided each with a central projection and a complementary recess, whereby the said leaves may be assembled with the projection of one leaf nesting within the recess of an adjacent leaf, of a seating member having a surface adapted to engage the depressed portion of the spring leaf next adjacent thereto, a driving block adapted to engage the depressed portion of the leaf at the opposite extremity of the series from the last mentioned leaf, and means coöperating with the seating member for compressing the spring leaves thereagainst, such compressing means through movement longitudinally of the spring imparting a longitudinal thrust through said block to the spring leaves.

7. The combination, with a multiple leaf spring having a series of leaves provided each with a central projection and a complementary recess, whereby the said leaves may be assembled with the projection of one leaf nesting within the recess of an adjacent leaf, of a seating member having a surface adapted to engage the depressed portion of the spring leaf next adjacent thereto, a pressure block coöperating with the leaf at the opposite extremity of the series from the last mentioned leaf, means coöperating with the pressure block and the seating member for compressing the spring leaves therebetween, and means adapted to engage the depressed portion of the leaf adjacent to the pressure block and operable by the longitudinal movement of said block with reference to said leaf for imparting a longitudinal thrust to said leaf and thereby to all of the leaves of the series.

8. The combination, with a multiple leaf spring having a series of leaves provided each with a central projection and a complementary recess, whereby the leaves may be centered with the projection of one leaf nesting within the recess of an adjacent leaf, of a bolt extending through the depressed portions of said leaves with its head in engagement with the projection of a leaf at one extremity of said series, a driving block on said bolt and having a projection adapted to fit within the recess in a leaf adjacent thereto, a nut on said bolt adapted to clamp said driving block in place, an axle chair, a filler block on said chair having a recess for the reception of one end of the bolt and a surface adapted to engage the depressed portion of the leaf adjacent thereto, a pressure block having a recess for the reception of the driving block, the front and rear sides of the driving block being closely adjacent to corresponding walls of said recess and said pressure block having transversely extending seats, U-shaped clips having their transverse portions seated in the last mentioned seats and extending through the axle chair and engaging opposite sides of the filler block, and adjustable means coöperating with the ends of said clips and the chair for compressing the spring leaves between the pressure block and the filler block.

9. The combination, with a multiple leaf spring having a series of leaves provided each with a central projection and a complementary recess, whereby the leaves may be centered with the projection of one leaf nesting within the recess of an adjacent leaf, of a bolt extending through the depressed portions of said leaves with its head in engagement with the projection of a leaf at one extremity of said series, a driving block on said bolt and having a projection adapted to fit within the recess in a leaf adjacent thereto, a nut on said bolt adapted to clamp said driving block in place, an axle chair, a filler block on said chair having a recess for the reception of one end of the bolt and a surface adapted to engage the depressed portion of the leaf adjacent thereto, a pressure block having a recess for the reception of the driving block, the front and rear sides of the driving block being closely adjacent to corresponding walls of said recess, and means extending through the axle chair and engaging opposite sides of the filler block for compressing the spring leaves between the pressure block and the filler block.

10. The combination, with a multiple leaf spring having a series of leaves provided each with a projection and a complementary recess, whereby the said leaves may be assembled with the projection of one leaf nesting within the recess of an adjacent leaf, of a seating member, a pressure block, means coöperating with said seating member and said pressure block for clamping the series of leaves therebetween, and means engaging the depressed portion of one leaf and forming a driving connection between the latter and the pressure block adapted to transmit thrust longitudinally of the spring from one to the other.

11. The combination, with a mutiple leaf spring having a series of leaves provided each with a projection and a complementary recess, whereby the said leaves may be assembled with the projection of one leaf nesting within the recess of an adjacent leaf, of a seating member, a pressure block, means coöperating with said seating member and said pressure block for clamping the series of leaves therebetween, a driving block secured on the leaf which adjoins the pressure block and interlocked with the depressed portion of the leaf, and said pressure block having means coöperating with said driving block and whereby thrusts longitudinally of the spring are transmitted between the latter and the pressure block.

In testimony whereof I hereunto affix my signature in the presence of two witnesses.

CHESTER E. CLEMENS.

Witnesses:
WM. P. CULVER,
VERA LOWE.